Dec. 3, 1963  A. G. SILVESTER  3,113,083
PLATE ASSEMBLY AND METHOD OF FABRICATION
Filed March 27, 1959  2 Sheets-Sheet 1

INVENTOR.
Austin G. Silvester

BY
Attorney

INVENTOR.
Austin G. Silvester though the pressure exerted is believed to contribute in a large measure to the fabrication of a satisfactory bond, a true cold welding effect is achieved through the use of this invention.

United States Patent Office 3,113,083
Patented Dec. 3, 1963

3,113,083
PLATE ASSEMBLY AND METHOD OF FABRICATION
Austin G. Silvester, Los Gatos, Calif., assignor to General Electric Company, a corporation of New York
Filed Mar. 27, 1959, Ser. No. 802,569
20 Claims. (Cl. 204—154.2)

This invention relates to a plate assembly and method of fabricating plates at an angle to at least one side wall. While this invention has a variety of applications, it has particular application as a method of assembling plate-type nuclear fuel to form a fuel element assembly for use in the core of a nuclear reactor and is described in this connection.

In nuclear reactors the fuel, for example uranium dioxide, is positioned in the reactor core in a fuel element assembly. In one common type the fuel is fashioned in the form of thin plates, each of which comprises a sandwich wherein the fuel or active fissionable material is surrounded by metallic cladding such as, for example, thin aluminum or zirconium strips which are cold-rolled to encase the fuel and to protect it from corrosion. A number of these nuclear fuel plates are assembled together to form a fuel element, to facilitate their insertion, positioning, and removal from the reactor core. The thin plates are positioned in the fuel element assembly in such a way that they are in spaced relationship so that a coolant fluid may be passed through the fuel element assembly to facilitate heat removal from each of the fuel plates during the nuclear reaction. The conditions within the reactor core are such that heat distortion as well as corrosion constitute major problems. It is, therefore, necessary that the fuel plates be held within the fuel element assembly in such a way that they will not become disengaged or shift their position during the period of their use in the nuclear reactor.

Fabrication of fuel plates into fuel element assemblies before this invention customarily employed the step of brazing each of the fuel plates to the side walls of the fuel element assembly. As each fuel plate is inserted into the assembly, a brazing compound is applied to the edges where bonding is desired, and after complete assembly, the plates and side walls are heated to effect brazing. Because of the temperatures utilized to effect brazing, a substantial amount of warpage tends to occur in the fuel element assembly necessitating the use of elaborate furnace annealing equipment. Generally, some remachining to effect realignment is required. In addition, because the brazing flux customarily contains lithium, lithium may become entrapped in the fuel element assembly. When this happens those assemblies are undesirable for use in a nuclear reactor, due to the fact that lithium is a reactor poison; i.e., it tends to capture neutrons. Difficulties are also encountered in effecting a brazed bond between each of the fuel plates and the side walls which is sufficiently uniform to resist the corrosive and heat distortion effects encountered in a nuclear reactor. The bond effected by brazing together the edges of each individual fuel plate and the side walls is such that a considerable number of voids are created in that area, making such areas particularly vulnerable to corrosion effects. In other portions of the joinder area, there is no brazed bond and the fuel plate tends to move and shift causing warpage during the heat treatment step used to effect brazing or during the period of its use in a nuclear reactor.

A technique not yet applied to fuel element assemblies, but customarily employed in the assembly of heat exchangers, is that of forming a fin on the side wall and folding this over the attached plate. Due to the folding or bending step, voids are formed at the joinder area so that corrosion may result.

Accordingly, an object of this invention is to provide an improved mechanically bonded plate assembly and method of fabrication which is heat and corrosion resistant.

Another object of this invention is to provide an improved plate assembly and method of fabricating a plate assembly.

In accordance with an aspect of this invention, plates are attached to the side walls by mechanically causing a portion of the metal of a side wall to flow mechanically onto the plate so that a cold welding effect is achieved.

Other objects and important aspects of this invention will become apparent from the following portions of the specification and claims taken in connection with the accompanying drawings in which:

Figure 1:
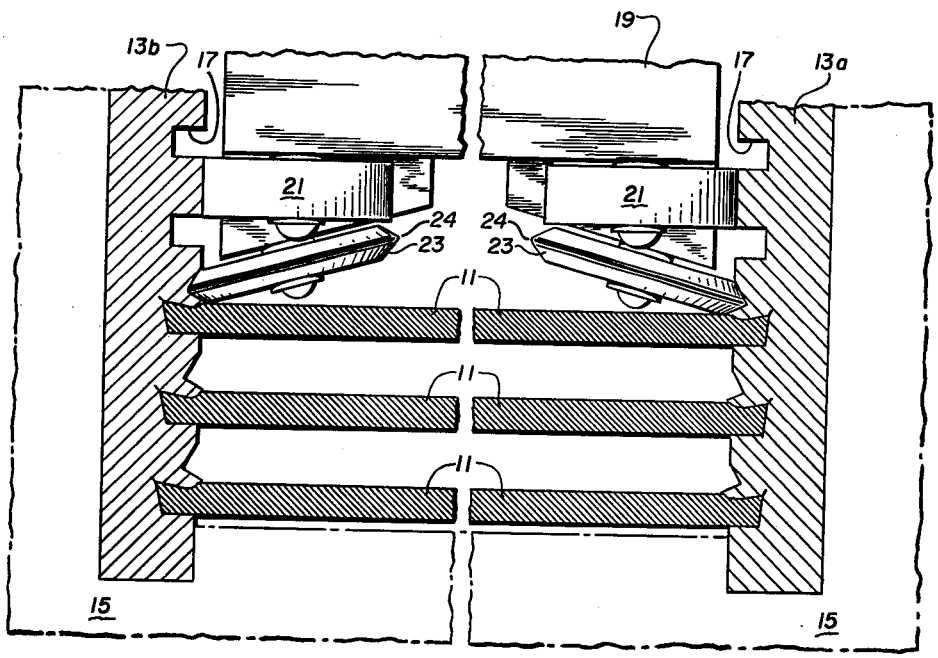
FIGURE 1 is an illustration partially in section of one embodiment of this invention.

The plate assembly shown in the process of fabrication in FIGURE 1 comprises the plates 11 and the side walls 13a and 13b. The side walls 13a and 13b are fixedly held in position by the backing jig 15. The edges of the plates 11 are accommodated in grooves 17 formed in the side walls 13a and 13b so that each one of a pair of grooves 17 is substantially parallel to the other. Fabrication is accomplished through the use of a deforming tool 19 adapted for longitudinal movement between the inner surfaces of the side walls 13a and 13b. The deforming tool 19 includes a pair of rollers 21 attached thereto and disposed to engage the ungrooved portion of the side walls 13a and 13b with sufficient pressure to align said side walls by urging them against the backing jig 15. Deformation of the side walls 13a and 13b is accomplished by a pair of rotatable deforming rolls 23 disposed so that the plane of their working edges 24 is disposed at an acute angle to the inner surfaces of the side walls 13a and 13b.

To accomplish fabrication, plate 11 is inserted between a pair of grooves 17 of the side walls 13a and 13b. The deforming tool 19 is positioned adjacent one end of the assembly so that rotatable deforming rolls 23 contact the side walls 13a and 13b above the upper surface of plate 11. The deforming tool 19 is then moved along the length of the assembly to cause a portion of the metal of side walls 13a and 13b to flow mechanically into groove 17 and into surrounding contact with the edges of the plate 11.

Figures 2A, 2B:
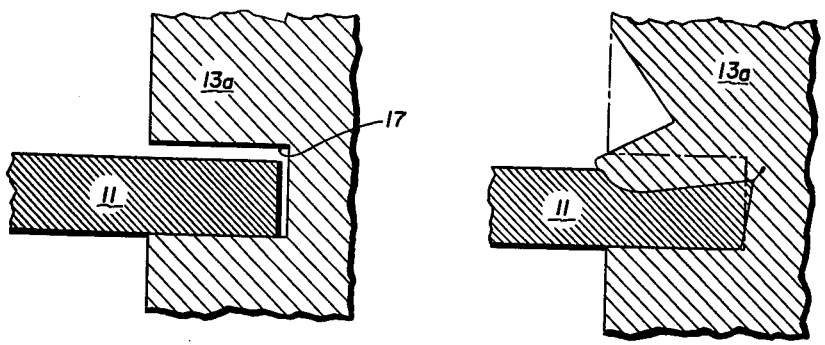
FIGURE 2a is an enlarged illustration in section of a portion of plate assembly positioned before fabrication.
FIGURE 2b is an illustration of the same portions after fabrication in accordance with this invention.

The mechanical flowing of a portion of side walls 13a and 13b can best be described in connection with FIGURES 2a and 2b. In FIGURE 2a groove 17 has a width greater than the thickness dimension of the plate 11 which it accommodates. The depth of groove 17 is sufficient so that the distance between the bottoms of a pair of grooves is greater than the width of a plate. This facilitates insertion of the edges of thin plate 11 into the grooves 17. In FIGURE 2b the metal of the side wall 13a adjacent groove 17 has been subject to such pressure to cause it to flow mechanically and to fill the void between plate 11 and side wall 13a. It will be obvious to those skilled in the art that the degree of metal flow accomplished is dependent both upon the mechanical properties of the metal of the side wall 13a and upon the pressure exerted by the rotatable deforming roll 23.

In one example, the side walls were made from 3/16 inch thickness 2-s or "1100" aluminum plate stock, which is commercially pure aluminum. The thin plates were also constructed of 2-s or "1100" aluminum plate stock rolled to a width of 2¾ inches and a thickness of 0.015 inch. The working edges 24 of the rotatable deforming rolls 23 were positioned 1/32 of an inch above the upper surface of the plate 11. The deforming tool 19 is made so that the distance between the working edges 24 is ⅛ of an inch wider than the distance between the inner ungrooved surfaces of side walls 13a and 13b. After fabrication in accordance with the method of this invention, a test plate assembly comprising 20 such plates having side walls 4 inches long and 3⅛ inches high, exhibited a tensile strength of a total applied load of at least 12,000 pounds across the 4 inch section. When similar plate assemblies were thermally cycled, more than 350 times between 100° F. and 300° F., they exhibited a tensile strength of a total applied load of at least 10,000 pounds across the 4 inch section. Similar plate assemblies were subjected to corrosion conditions by immersion for 30 days in 300° F. demineralized water and substantially the same tensile strengths were exhibited. Examination of metallographic specimens of the assemblies subjected to corrosion tests showed no indication of detrimental corrosion effects in the area where the thin plates were secured to the side walls. In comparison with the customarily employed brazing method, results were superior with respect to corrosion effects due probably to the absence of brazing flux materials in the joinder area as well as the absence of voids.

It should be pointed out that if the side walls 13a and 13b are made of a material which does not readily flow mechanically or if the machine utilized to accomplish fabrication is of a type which cannot apply substantial pressures to the side walls, the side walls may be grooved to facilitate the mechanical flow of side wall metal onto the plate. For example, a second series of grooves can be formed just above the grooves used to accommodate plates 11. Other techniques familiar to those skilled in the art to facilitate mechanical flowing of the side wall material can, of course, be employed.

By causing the side wall material to flow into contact with the plate edges, voids are substantially eliminated in the joinder areas and in some instances the flow is sufficient to approach a good metallurgical bond. This greatly minimizes corrosion problems, particularly because corrosive fluids cannot reach the joinder area.

As shown in the drawings, particularly FIGURES 1 and 2b, a portion of the "land" between adjacent grooves 17 in the side walls 13a and 13b has been permanently deformed so that it projects tightly into and substantially fills a depression extending along adjacent each edge of the fuel plate 11 within the side wall grooves. The minimum thickness of the fuel plate 11 at the depression, and accordingly the distance therethrough perpendicular to said fuel plates between adjacent parts of side wall 13a on opposite sides of a given groove is less than the thickness of the fuel plate at its adjacent edge at the bottom of the side wall groove as shown in FIGURE 2b, thereby securing or locking the fuel plate 11 positively at its edges into the side wall 13a. The ratio of the fuel plate thickness at the depression, or the distance between adjacent parts of the side wall on opposite sides of the groove, to the maximum thickness of the fuel plate at the edge of the fuel plate is always less than 1.0, and is preferably between about 0.98 and about 0.65. For nuclear plate-type fuel assemblies fabricated of the usual structural materials, such as aluminum, zirconium, and alloys thereof, and stainless steel, the distance between adjacent parts of the side wall measured through the depression is at least about 0.004 inch less than the maximum thickness of the edge of the fuel plate within the side wall groove. The depression is located in the fuel plate between the fuel plate edge at the bottom of the side wall groove and the intersection of fuel plate surface with the inner surface of the side wall. The actual position of the depression within these limits is dependent upon the relative strengths of the fuel plate and side wall materials. For a locked connection of optimum strength, the position is located between these two limits so that the fuel plate and side wall portions of the connection have equal shear resistances.

The depression extending along the surface of the fuel plate adjacent its edge can be formed by a permanent deformation of this part of the fuel plate substantially simultaneously with the permanent deformation of the land between adjacent side wall grooves. Alternatively, this depression can be performed in the fuel plate surface and the side wall land subsequently deformed permanently into the existing fuel plate depression to form the locked connection. In either case the fuel plates are integrally secured or locked positively into the side walls without added fusible metals or fluxes, and cannot be separated from one another without destruction of the entire assembly.

Mechanical flowing, which is done without the application of heat, eliminates warpage in manufacture and makes it possible to maintain the precision of critical dimensions. The plate is held firmly in position since its edge is in almost complete contact with the side walls. In many instances, the edge of the plate itself is slightly deformed by the flow of the side wall material, thereby enhancing the bond with the side wall. Warpage, resulting from heat distortion as the assembly is subject to temperature changes, is minimized because the plate and side wall are so nearly made one by the substantially complete mechanical bond.

Figure 3:
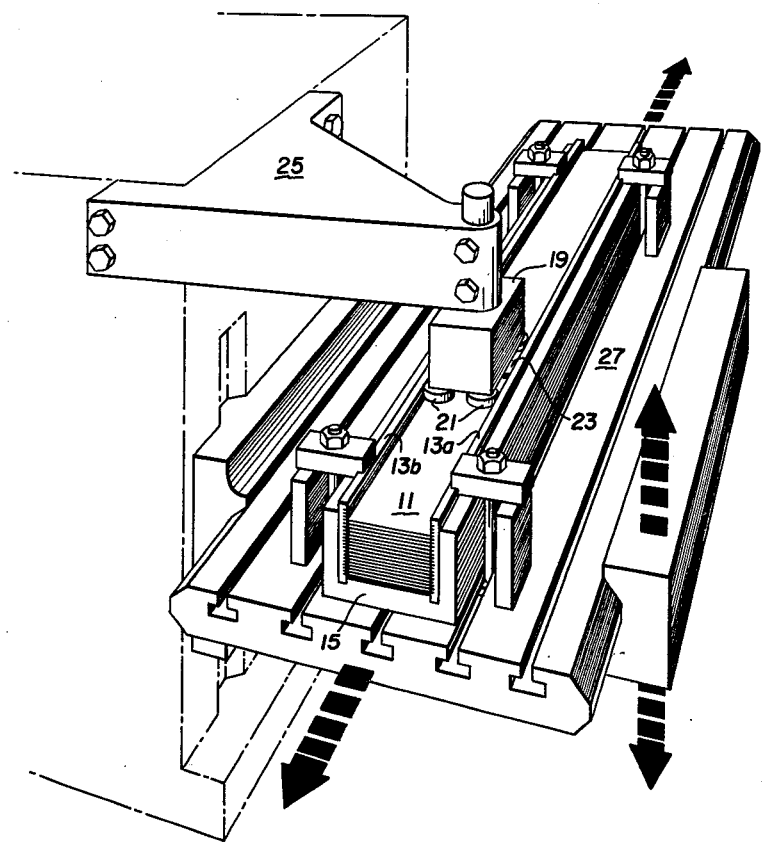
FIGURE 3 is an illustration drawn in perspective showing the employment of the invention in conjunction with a milling machine.

As shown in FIGURE 3, a milling machine of the type having a movable bed adjustable upwardly and downwardly can be successfully employed in fabricating plate assemblies in accordance with the teachings of this invention. However, it will be obvious to those skilled in the art that many other types of apparatus can be employed. The deforming tool 19 is fixedly held by the tool holding arm 25 of the milling machine. The jig 15, holding the side walls 13a and 13b, is attached to the bed 27 of the milling machine and passes longitudinally beneath the deforming tool 19 to accomplish fabrication. As each thin plate 11 is fixedly attached to the side walls 13a and 13b during one pass of the bed, the machine is stopped, another plate 11 is inserted, the height of the bed is lowered, and the bed is moved in the opposite direction to cause the assembly to pass beneath the stationary deforming tool 19 and bond another plate to the side walls.

This application is a continuation-in-part of my copending application Serial No. 642,296, filed February 25, 1957, now abandoned.

While the practice of this invention has been described in connection with specific applications, it will be readily apparent to those skilled in the art that it is subject to a wide variety of modifications and applications. Therefore, it is intended in the appended claims to cover all modifications and variations coming within the true spirit and scope of this invention.

I claim:

1. A plate type nuclear fuel assembly which comprises at least one substantially flat nuclear fuel-containing plate member, a pair of parallel substantially flat side wall members spaced apart from one another and each having a groove therein, said side wall members being secured to the edges of said plate member solely by means of a permanent mechanical deformation of that portion of the side wall member immediately adjacent the groove and into a depression extending along adjacent the edge of said plate member, the distance between adjacent parts of said side wall member on opposite sides of said groove measured through said depression being less than the maximum thickness of the edge of said plate member whereby said plate member is locked positively into said side wall members.

2. A plate type nuclear fuel assembly comprising a plurality of parallel relatively close-spaced substantially flat nuclear fuel-containing plate members, a pair of parallel relatively wide-spaced substantially flat side wall members having a plurality of grooves in their adjacent surfaces, said plate members being secured to said side wall members solely by means of permanent mechanical deformations of those portions of said side wall members between the adjacent grooves into a depression extending along adjacent each edge of said plate members, the ratio of the distance measured through said depression between adjacent parts of said side wall members on opposite sides of said groove to the maximum thickness of said flat plate member at the edge thereof being less than 1.0 whereby all of said plate members are locked positively into said side wall members.

3. A plate assembly according to claim 2 wherein said plate members are secured at substantially right angles to and between said side wall members.

4. A plate assembly according to claim 2 wherein said ratio is between about 0.65 and 0.98.

5. A plate type nuclear fuel assembly which comprises a pair of side walls disposed substantially parallel to and relatively wide-spaced apart from one another, the adjacent faces of said side walls being provided with a plurality of substantially parallel and relatively close-spaced grooves, a plurality of relatively close-spaced fuel plates containing nuclear fuel disposed substantially parallel to one another and at substantially right angles to and between said side walls, the edges of said fuel plates being tightly secured to said side walls solely by means of a permanent mechanical deformation of that portion of each of said side walls between the adjacent grooves into a depression extending along adjacent each edge of said fuel plates, the distance measured through said depression between adjacent parts of said side wall being at least about 0.004 inch less than the thickness of said fuel plate adjacent its edge, thereby locking said fuel plate positively into said side wall.

6. A plate type nuclear fuel assembly which comprises a pair of side walls disposed substantially parallel to and relatively wide-spaced apart from one another, the adjacent faces of said side walls being provided with a plurality of substantially parallel and relatively close-spaced grooves, a plurality of relatively close-spaced fuel plates containing nuclear fuel disposed substantially parallel to one another and at substantially right angles to and between said side walls, the edges of said fuel plates being tightly secured to said side walls solely by means of a permanent mechanical deformation of that portion of each of said side walls between the adjacent grooves into a depression extending along adjacent each edge of said fuel plates, the ratio of the distance measured through said depression between adjacent parts of said side walls on opposite sides of a given groove therein to the thickness of the fuel plate adjacent the edge thereof being less than 1.0, thereby locking said fuel plate positively into said side wall.

7. A plate type nuclear fuel assembly which comprises a pair of side walls disposed substantially parallel to and relatively wide-spaced apart from one another, the adjacent faces of said side walls being provided with a plurality of substantially parallel and relatively close-spaced grooves, a plurality of relatively close-spaced fuel plates containing nuclear fuel disposed substantialy parallel to one another and at substantially right angles to and between said side walls, the edges of said fuel plates being tightly secured to said side walls solely by means of a permanent mechanical deformation of that portion of each of said side walls between the adjacent grooves into a depression extending along adjacent each edge of said fuel plates, the ratio of the distance measured through said depression between adjacent parts of said side walls on opposite sides of a given groove therein to the thickness of the fuel plate adjacent the edge thereof being between about 0.65 and about 0.98 thereby locking said fuel plate positively into said side wall.

8. A plate type nuclear fuel assembly which comprises a pair of side walls disposed substantially parallel to and relatively wide-spaced apart from one another, the adjacent faces of said side walls being provided with a plurality of substantially parallel and relatively close-spaced grooves, a plurality of relatively close-spaced fuel plates containing nuclear fuel disposed substantially parallel to one another at substantially right angles to and between said side walls, the edges of said fuel plates being tightly secured to said side walls solely by means of a permanent mechanical deformation of that portion of each of said side walls between the adjacent grooves into a depression extending along adjacent each edge of said fuel plates, said depressions being located in said fuel plate between the edge thereof in the side wall groove and the intersection of the fuel plate surface with the inner surface of said side wall, the minimum thickness of said fuel plate at the depression being less than the thickness of the adjacent edge of said plate in the side wall groove thereby locking said fuel plate positively into said side wall.

9. A method for fabricating a plate type nuclear fuel assembly in which a fuel plate is joined to and between a pair of side plates which comprises permanently mechanically deforming a portion of each of said side plates immediately adjacent a groove therein into a depression extending along adjacent each edge of said fuel plate so that the thickness of said fuel plate at said depression is less than the thickness of the adjacent edge of said fuel plate thereby locking said fuel plate positively into said side plates.

10. A method for assembling a nuclear fuel plate between a pair of side plates which comprises inserting the edges of said fuel plate into a groove in each of said side plates, then permanently deforming a portion of said side plates adjacent said grooves therein into depressions extending along adjacent the edges of said fuel plate so that the distance through said depression between adjacent parts of said side plate on opposite sides of said grooves therein is less than the thickness of said fuel plate adjacent the edge thereof in said groove and thereby locking said fuel plate positively into said side plates.

11. A process according to claim 10 wherein said depression in said fuel plate is formed substantially simultaneously with the permanent deformation of the portion of said side plates.

12. A method for assembling a nuclear fuel plate between a pair of side plates which comprises forming a depression extending along the surface of said fuel plate adjacent each edge thereof, inserting the edges of said fuel plate into a groove in each of said side plates, then permanently deforming a portion of said side plates adjacent said grooves therein into said depressions adjacent the edges of said fuel plate so that the distance through said depression between adjacent parts of said side plate on opposite sides of said grooves therein is less than the thickness of said fuel plate adjacent the edge thereof in said groove and thereby locking said fuel plate positively into said side plates.

13. A method for joining a plurality of relatively close-spaced parallel nuclear fuel plates to and between a pair of relatively wide-spaced side walls to form a plate type nuclear fuel assembly which comprises inserting the opposite edges of a fuel plate into corresponding grooves in said side walls, permanently deforming a portion of the land in said side wall adjacent said grooves into a depression extending along said fuel plate adjacent each edge thereof so that the ratio of the distance measured through said depression between adjacent parts of said side wall on opposite sides of said groove to the thickness of said fuel plate adjacent its edge is between about 0.98 and about 0.65 thereby locking said fuel plate positively at its edges into said side walls, inserting another fuel plate in an adjacent pair of grooves, and repeating the aforementioned deformation step until said plurality of fuel plates is securely bonded at their edges to and between said side walls.

14. A method according to claim 13 in combination with the steps of maintaining said plates at substantially right angles to said side walls during the mechanical deformation thereof.

15. A process which comprises securing a pair of side walls in positions parallel to and relatively wide-spaced apart from one another, said side walls each having at least one elongated groove in the adjacent faces thereof, positioning a nuclear fuel plate between said side walls so that the edges of said fuel plate are at least partially inserted into said grooves, and then permanently deforming a portion of the land in said side walls adjacent said grooves so that it projects tightly into and substantially fills a depression in said fuel plate which extends along adjacent the edge thereof so that the thickness of said fuel plate measured through said depression is at least about 0.004 inch less than the thickness of said fuel plate at its edge in said groove thereby locking said fuel plate positively at its edges into said side wall.

16. A process according to claim 15 wherein said side walls are provided with a plurality of said grooves disposed substantially parallel and relatively close to one another, in combination with the alternate repetitive steps of inserting another fuel plate in the next adjacent pair of grooves, and permanently deforming a portion of the land immediately adjacent said grooves to secure the edges of each of a plurality of said fuel plates in sequence between said side walls.

17. A process according to claim 15 wherein said fuel plate is secured at substantially right angles between said side walls.

18. A process for producing a plate-type nuclear reactor fuel element which comprises securing a pair of side walls, each having a plurality of relatively close-spaced and parallel grooves, in relatively wide-spaced parallel positions with the grooved surfaces facing each other, inserting between said side walls a fuel plate containing a nuclear fuel so that its edges are at least partially inserted into the first grooves in the respective side walls nearest one edge thereof, then running a deforming tool simultaneously along the lands in the adjacent faces of said side walls between the first grooves containing the edges of said fuel plate and the second grooves immediately adjacent thereto and thereby applying sufficient pressure to deform said land into a depression extending along each edge of said fuel plate within the side wall grooves so that the distance through said depression perpendicular to said fuel plate between adjacent parts of said side wall is less than the thickness of the edge of the fuel plate at the bottom of the side wall groove thereby locking said fuel plate positively into said side walls, inserting between said side walls another fuel plate with its edges at least partially inserted in said second grooves, thus deforming a portion of the lands in the side walls between the second and third grooves, and repeating the alternate fuel plate insertions and side wall land deformations to produce an integral nuclear reactor fuel element of parallel relatively close-spaced fuel plates locked positively at their edges between a pair of parallel relatively wide-spaced side walls.

19. A process according to claim 18 wherein the deforming tool is held stationary and said fuel plates and side walls are moved relatively thereto during the deforming step.

20. A process according to claim 18 wherein said fuel plates and side walls are held stationary and the deforming tool is moved relatively thereto during the deforming step.

References Cited in the file of this patent

UNITED STATES PATENTS

| | | |
|---|---|---|
| 164,379 | Kloman | June 15, 1875 |
| 1,928,639 | Berg | Oct. 3, 1933 |
| 2,025,036 | Berg | Dec. 24, 1935 |
| 2,525,092 | Bruegger | Oct. 10, 1950 |
| 2,831,806 | Wigner | Apr. 22, 1958 |
| 2,989,456 | Jessen | June 20, 1961 |